United States Patent [19]

Kniest et al.

[11] Patent Number: 4,769,793
[45] Date of Patent: Sep. 6, 1988

[54] DUAL REFERENCE SURFACE TRANSDUCER

[75] Inventors: James N. Kniest, Edmonds; James M. Hossack, Redmond; Walter Lecoque, Baring, all of Wash.

[73] Assignee: Ultrasonic Arrays, Inc., Woodinville, Wash.

[21] Appl. No.: 828,924

[22] Filed: Feb. 12, 1986

Related U.S. Application Data

[63] Continuation-in-part of Ser. No. 759,063, Jul. 24, 1985, abandoned.

[51] Int. Cl.⁴ .............................................. G01S 9/66
[52] U.S. Cl. .................................. 367/99; 367/151; 367/902
[58] Field of Search ............... 367/13, 99, 108, 140, 367/151, 902, 908

[56] References Cited

U.S. PATENT DOCUMENTS

| | | | |
|---|---|---|---|
| 3,184,969 | 5/1965 | Bolton | 367/902 X |
| 4,008,455 | 2/1977 | Pedersen | 367/902 X |
| 4,170,765 | 10/1979 | Austin et al. | 367/908 X |
| 4,210,969 | 7/1980 | Massa | 367/108 |
| 4,470,299 | 9/1984 | Soltz | 367/908 X |
| 4,569,037 | 2/1986 | Seiferling | 367/13 X |
| 4,581,726 | 4/1986 | Makino et al. | 367/99 |
| 4,719,605 | 1/1988 | Eder | 367/98 |

OTHER PUBLICATIONS

Buck, R., "Sound Idea Aids Assembly of Diapers, Cars and More", *The Seattle Times*, Oct. 24, 1985.
Cleaveland, P., "Automated Inspection in the Factory: A Technology Update", *The Industrial and Process Control Magazine*, 8-1985.
Inglesby, T. "Inspecting and Measuring with 'Dog Whistles'", *Manufacturing Systems*, Aug. 1985.
"Ultrasonic Distance Measurements", *Electronic Product Design*, Aug. 1981.

*Primary Examiner*—Ted L. Parr
*Attorney, Agent, or Firm*—Flehr, Hohbach, Test, Albritton & Herbert

[57] ABSTRACT

An ultrasonic transducer and method for detecting the distance to an object using ultrasonic energy. The transducer includes a foil which creates ultrasonic energy. First and second reference surfaces are provided which are spaced between the transducer and the object. The two reference surfaces provide for immunity against temperature and positional changes.

14 Claims, 8 Drawing Sheets

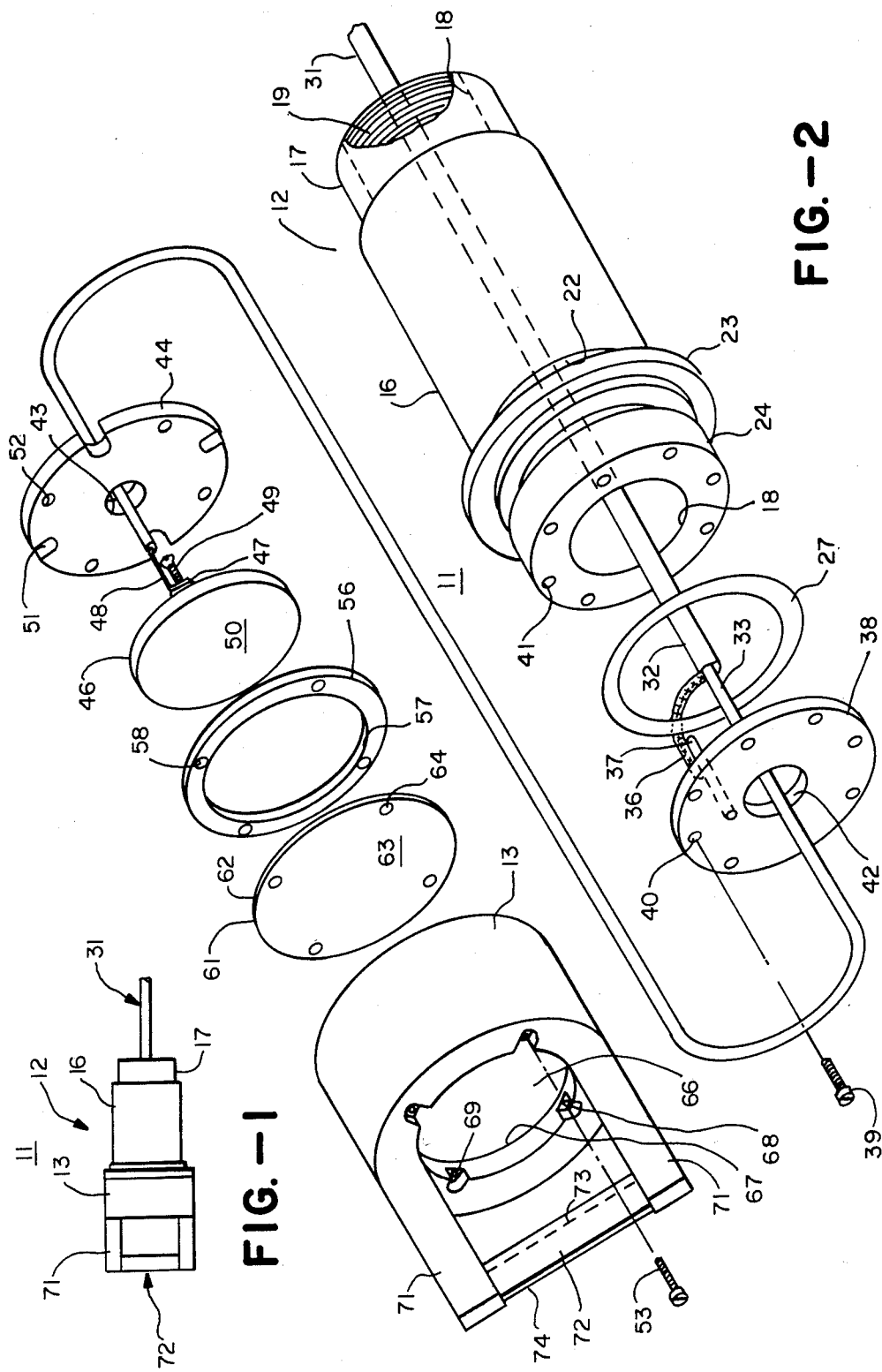

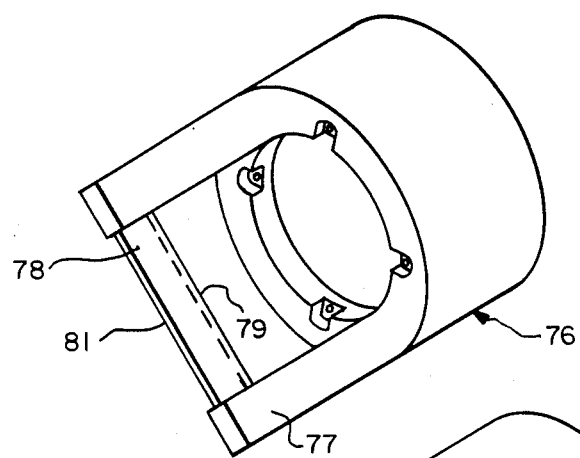
FIG.—3
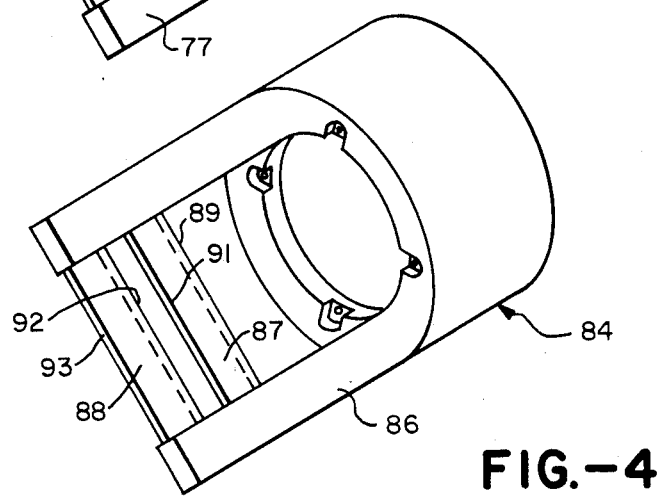
FIG.—4
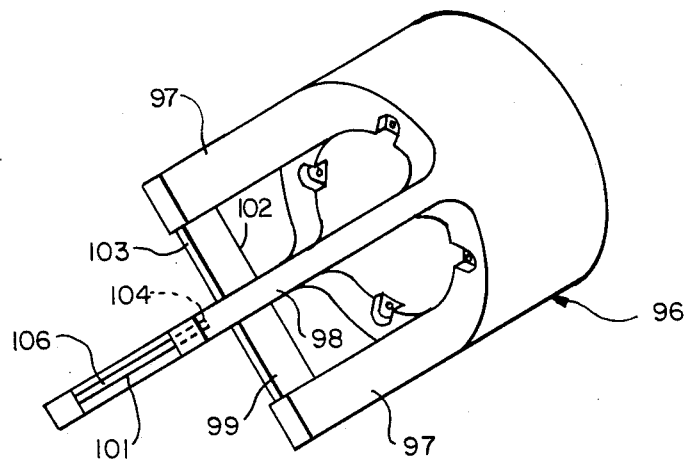
FIG.—5

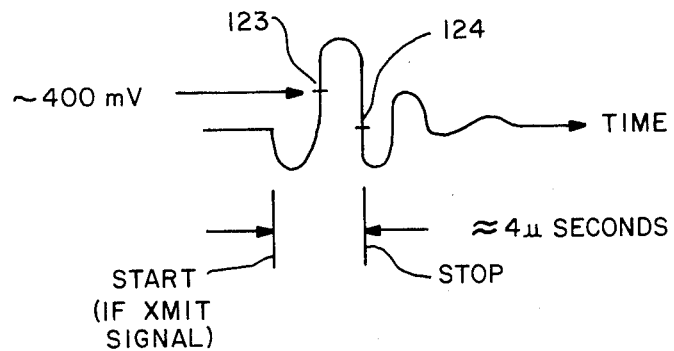
FIG. — 7
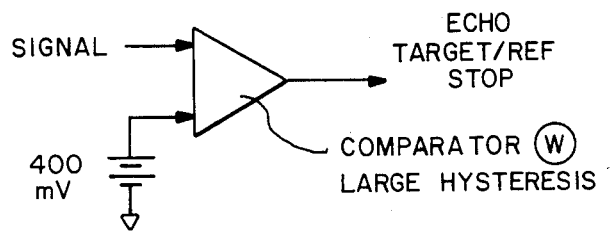
FIG. — 8
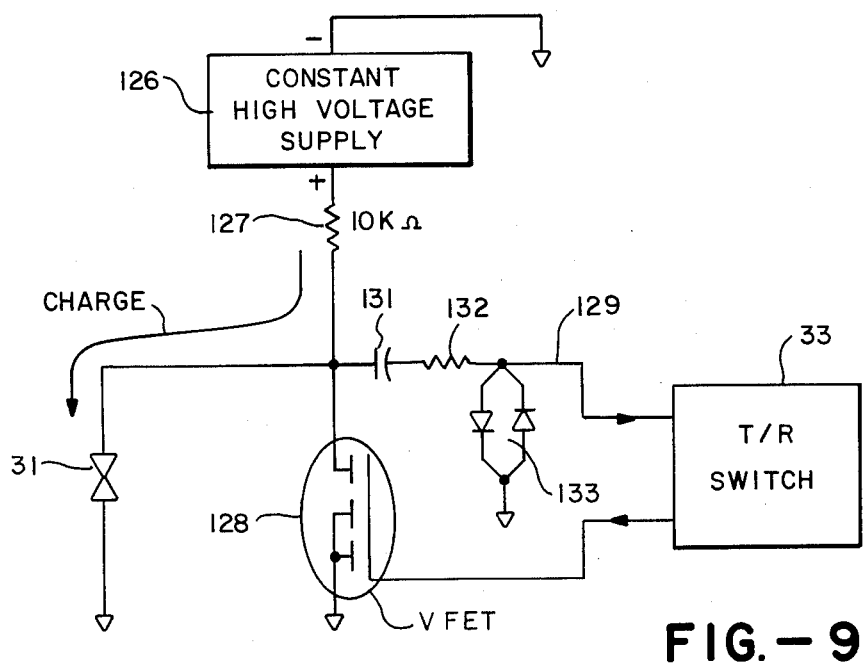
FIG. — 9

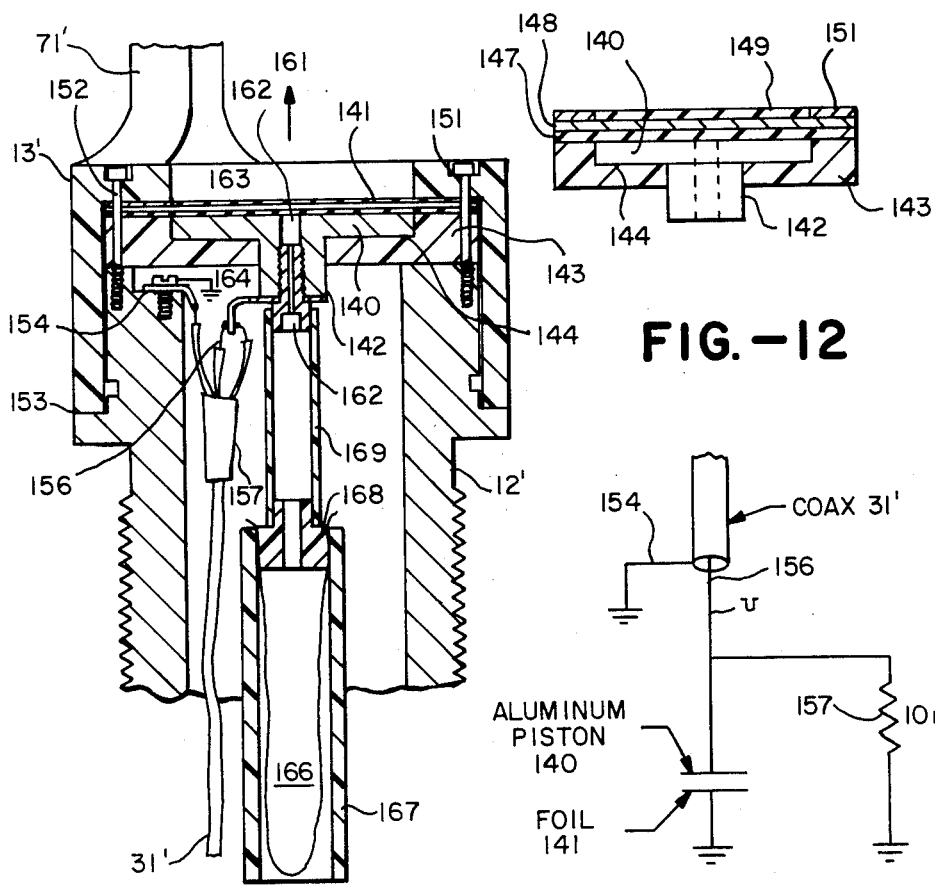
FIG.-11
FIG.-12
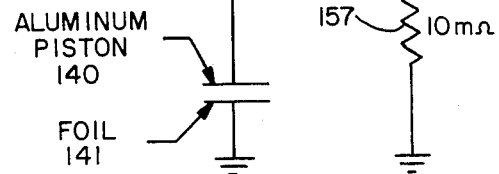
FIG.-13
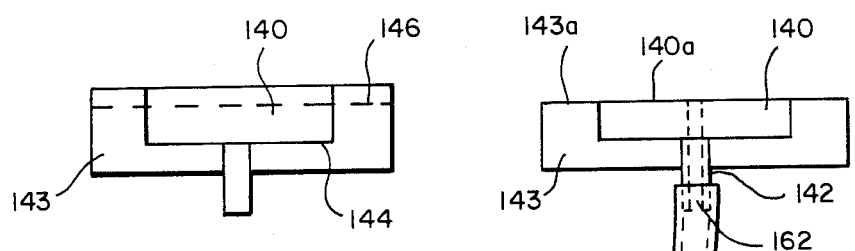
FIG.-14A
FIG.-14B
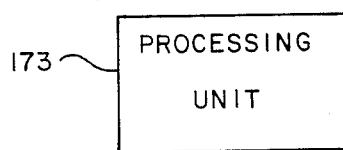

DUAL REFERENCE SURFACE TRANSDUCER

This is a continuation-in-part of application Ser. No. 759,063, filed July 24, 1985, now abandoned.

This invention relates to an ultrasonic transducer and method.

In co-pending application, Ser. No. 532,576, filed on Sept. 15, 1983, there is disclosed an ultrasonic apparatus system and method. It has been found that the ultrasonic transducer therein disclosed is unduly complex for us in a number of applications. There is, therefore, a need for a new and improved ultrasonic transducer.

In general, it is an object of the present invention to provide an ultrasonic transducer which efficiently creates ultrasonic energy with very short rise times.

Another object of the invention is to provide a transducer of the above character which is very durable and can be utilized in adverse environments.

Another object of the invention is to provide a transducer of the above character in which it makes it possible to make measurements which are independent of changes of the speed of travel of sound in air and thus independent of temperature.

Another object of the invention is to provide an apparatus and method of the above character in which measurements can be made independent of temperature and independent of the position of the exact position of the foil from the reference surface.

Additional objects and features of the invention will appear from the following description in which the preferred embodiments are set forth in detail in conjunction with the accompanying drawings:

FIG. 1 is an isometric view of a transducer incorporating the present invention.

FIG. 2 is an exploded view of the transducer shown in FIG. 1.

FIG. 3 is an isometric view of another embodiment of a fronthousing for use on the transducer shown in FIG. 1 showing the use of two separate reference surfaces carried by a single reference bar.

FIG. 4 is an isometric view of still another front housing showing the use of two separate reference bars carrying two separate reference surfaces.

FIG. 5 is an isometric view of still another embodiment of a front housing showing the use of two reference bars providing two reference surfaces in which the reference bars are disposed at an angle to each other.

FIG. 7 is a waveform of typical echo pulse and also a transmit pulse.

FIG. 8 is a block diagram of a circuit to process an echo purse.

FIG. 9 is a circuit schematic partially in block diagram form illustrating in detail a pulse circuit for the production of ultrasonic energy.

FIG. 11 is a cross-sectional view and an alternative emboment of an ultrasonic transducer embodying the present invention.

FIG. 12 is an enlarged view of a portion of FIG. 11.

FIG. 13 is a detailed circuit schematic of a portion of FIG. 11.

FIGS. 14A and 14B are cross-sectional elevation views of portions of FIG. 12 showing a processing step in forming that portion, and FIG. 14B also includes a block diagram of an alternative embodiment of the invention.

Figure 15A:
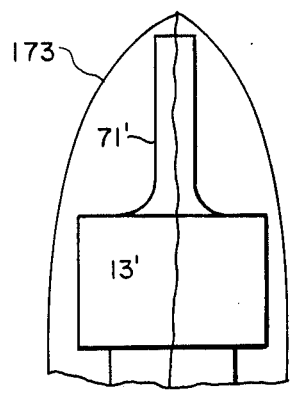
FIG. 15A is a line view in elevation of an alternative embodiment of the present invention.

FIG. 15 B is a plan view of FIG. 15A.

Figure 15B:
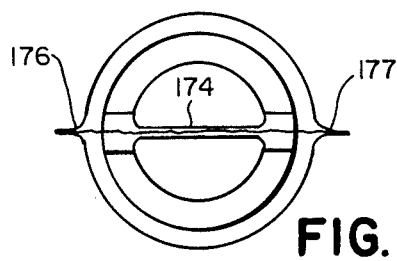
Figure 15C:
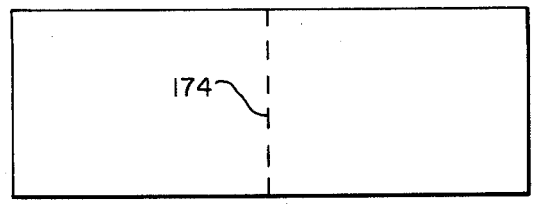

FIG. 15C is a plan view in an unfolded form of a portion of FIG. 15A.

Figure 16:
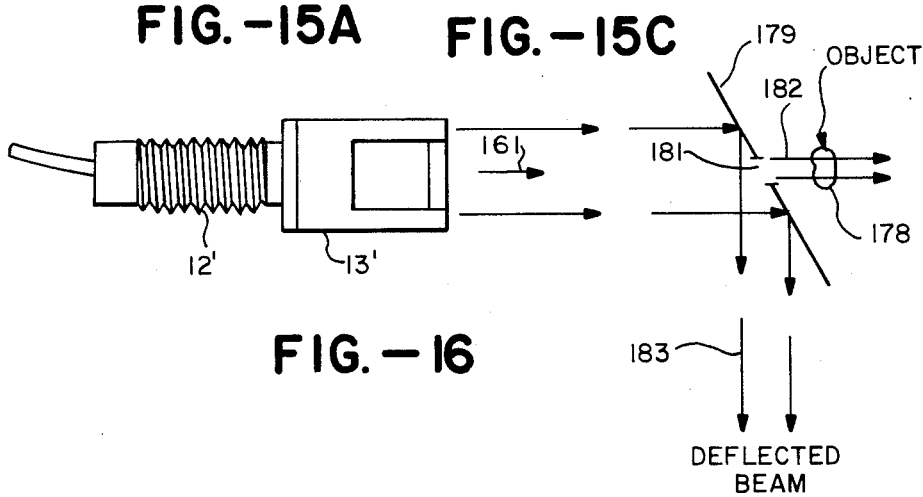

FIG. 16 is a diagramatic sketch of FIG. 11 showing one embodiment of its use.

Figure 17:
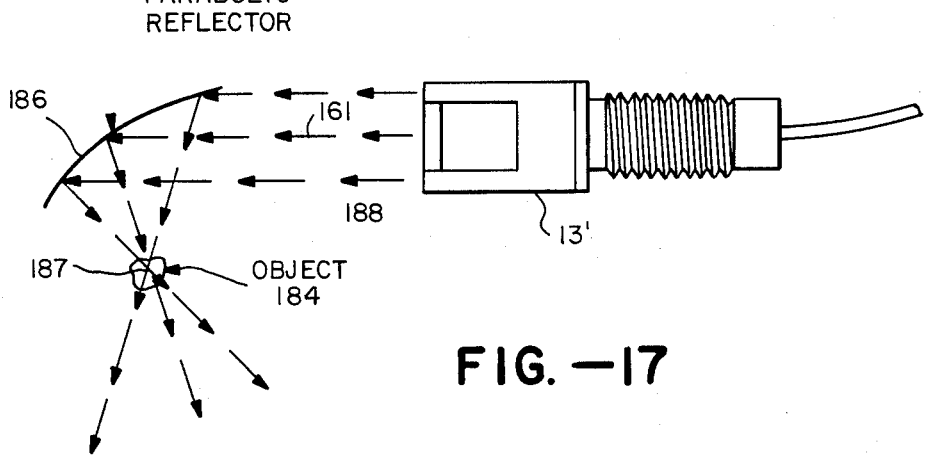

FIG. 17 is a diagramatic sketch of FIG. 11 showing another embodiment of its use.

The ultrasonic transducer and method of the present invention is used in an apparatus for detecting the distance to an object using ultrasonic energy. The transducer which includes a foil creates ultrasonic energy. It also includes a reference having a surface for reflecting ultrasonic energy to create an echo. The reference is positioned between the transducer and the object with the reference being at a known distance from the transducer. The apparatus includes means for ascertaining the distance to the target by taking a ratio of the time required for ultrasonic energy to travel from the foil to the reference surface and an echo to return from the reference surface and for ultrasonic energy to travel from the foil to the object and an echo to return from the object so that the distance to the object can be ascertained independent of temperature of the air through which the ultrasonic energy travels. In order to make the distance measurement independent of the exact position of the foil in the transducer, a second reference surface is provided which is spaced a predetermined distance away from the first reference surface and which is disposed between the transducer and the object. The apparatus also includes means for ascertaining the elapsed times between the echoes received from the first named and additional reference surfaces for ascertaining the distance to the object independent of the exact position of the foil in the transducer.

The ultrasonic transducer 11 which is shown in FIGS. 1 and 2 of the drawings consists of a mounting stud 12 and a front housing 13. The mounting stud 12 is provided with an intermediate cylindrical portion 16 and an end cylindrical portion 17. The mounting stud 12 can be formed of a suitable material such as aluminum. The mounting stud 12 is provided with a cylindrical bore 18 which extends longitudinally of the same. The portion of the bore which is in the end portion 17 is provided with interior threads 19 of a standard type so that the mounting stud can be threaded onto a conventional piece of one-half inch electrical conduit (not shown). The intermediate cylinlrical portion 16 is provided with exterior threads (not shown) also of a conventional type to facilitate mounting of the transducer 11 on apparatus such as on a panel (not shown).

The mounting stud 12 is also provided with an annular recess 22 which is immediately behind a radially extending flange 23. The recess 22 can be omitted if desired and is merely provided to clear the tool when machining the mounting stud 12. As hereinafter described, the flange 23 has an outer diameter which is the same outer diameter as the diameter of the front housing 13. The mounting stud 12 is also provided with a front cylindrical portion 24 which extends forwardly of the flange 23. An annular recess 26 is provided in the front cylindrical portion 24 for receiving an 0-ring 27. The O-ring 27 forms a water-tight seal between the housing 13 and the mounting stud 12.

A coaxial cable 31 is provided which is connected to the transducer 11. It consists of an outer cylindrical ground 32 and a center conductor 33. The outer conductor 32 is connected by a lead 36 to a stud 37 by suitable means such as brazing. The stud 37 is carried by a grounding disc 38 formed of a suitable material, such as brass. The grounding disc 38 is secured to the front surface of the cylindrical portion 24 by fillister head screws 39 extending through holes 40 provided in the grounding disc 38 and threaded into threaded holes 41 provided in the cylindrical portion 24.

The grounding disc 38 is provided with a centrally disposed hole 42 through which the center conductor 33 of the coaxial cable 31 extends. The center conductor 33 also extends through another hole 43 provided in a piston mounting disc 44. The piston mounting disc 44 supports a piston 46 which is disc-like in shape and which is provided with a centrally disposed rearwardly extending stud 47 which seats within the hole 43 of the piston mounting disc 44. The center conductor 33 of the coaxial cable 31 is secured to the stud 47 by suitable means as, for example, by the use of an L-shaped spade lug 48 by suitable means, such as solder. The lug 48 is secured to the stud 47 by a screw 49 threaded into the stud.

The front side of the piston 46 is provided with a flat planar circular surface 50 which serves as one plate of a capacitor for the transducer 11. The piston mounting plate 44 is provided with four slots 51 on the outer margin of the same which are adapted to accommodate the heads of the fillister head screws 39. It also is provided with four holes 52 for receiving four fillister screws 53 which are used for securing the front housing 13 to the mounting stud 12. A support ring 56 is provided which has a central opening 57 which accommodates the piston 46. The support ring 56 is seated upon the piston mounting disc 44 and is provided with four uniformly spaced holes 58 which are adapted to accommodate the screws 53. The support ring 56 can be formed of any suitable material Although it need not be conducting, it has been formed of aluminum to provide the desired support.

A foil 61 is provided which has its outer margin secured to the support ring 56 by suitable means, such as double-sided adhesive tape (not shown). The foil 61 is formed of a layer 62 of insulating material and a conducting layer 63 formed on the surface of the insulating material facing forwardly. The layer of the insulating material can be of any suitable type as, for example, a film of KAPTON insulating material of a suitable thickness as, for example, 30 gauge KAPTON having a thickness of approximately 0.3 of a mil. The conducting layer 63 is formed of a suitable material, such as gold evaporated onto the front surface of the insulating layer to a suitable thickness as, for example, 50 to 500 Angstroms.

The conducting layer 63 formed on the insulating layer 62 of the foil 61 serves as the second plate of a capacitor for the transducer 11.

In assembling the various parts hereinbefore described, the piston 46 is secured to the piston mounting disc 44 by suitable means, such as an adhesive. For example, Eastman 910 super glue can be utilized if desired. In a similar manner, the piston mounting disc 44 can be secured to the grounding disc 38 by an adhesive. The coaxial cable 31 is extended through the mounting stud 12 and is secured to the lug 48 by soldering. The grounding disc 38 is then secured to the mounting stud 12 by the use of the fillister head screws 39 extending through the slots 51 of the piston mounting disc 44. Thereafter, the foil can be secured to the support ring 56 by the doublesided sticky tape and then the support ring 56 can be placed over the piston 46.

From the foregoing construction, it can be seen that approximately the outer 0.100 of the outer margin of the foil 61 is secured to the support ring 56. The entire assembly hereinbefore described which is carried by the front cylindrical portion 24 of the mounting stud 12 is enclosed within the cylindrical housing 13 that is provided with a bore 66 which is adapted to fit over the front cylindrical portion 24 and form a liquid-tight seal with respect to the O-ring 27. The housing is also provided with an inwardly extending annular lip 67 which overlies the outer margin of the foil 61. Recesses 68 are provided in this lip 67 which are adapted to receive the heads of the fillister head screws 53 that extends through holes 69 extending through the recesses 68. The screws 53 also extend through holes 64 in the foil 61, holes 58 in the support ring 56 through holes 52 in the piston mounting disc 44 through holes 40 in the grounding disc 38 and threaded into holes 41 provided in the mounting stud 12. This forms a compact transducer assembly in which the outer diameter of the cylindrical housing 13 has the same outer dimension as the flange 23 of the mounting stud 12.

The housing 13 is provided with two upstanding posts 71 formed integral therewith and which extend forwardly from the front housing 13. The posts 71 carry a reference bar 72. The reference bar 72 is roughly rectangular in cross-section and is provided with first and second surfaces 73 and 74 which are parallel to each other and lie in planes which are generally parallel to the plane of the foil 61. The reference bar 72 is positioned in such a manner so that the first surface 73 is within one-half inch to an inch of the foil 61. Although the reference bar has been shown as being rectangular in cross section, this need not necessarily be the case. For example, it can be in the form of a small rod or a wire if desired. It is, however, desirable that the reference bar or member 72 be of relatively small dimensions in thickness so that it does not unduly obstruct the ultrasonic energy being emitted from the transducer. The reference bar should be strong so that it will not bend under normal usage of the transducer. However, it should not be so large as to unduly obstruct the sound produced by the transducer from reaching the target.

In the embodiment of the invention in FIG. 2, the surface 73 is planar and lies in a plane which is parallel to the foil 61. The other surface 74, however, since it is desired only to receive one reflection from the reference bar 72 is rounded or in other words is substantially convex on its outer or forward surface so that the sound waves propagated by the transducer will roll around the surface and will not be reflected by that surface.

In FIG. 3 there is shown another embodiment of a front housing 76 having upstanding posts 77 carrying a reference bar 78 that is provided with first and second reference surfaces 79 and 81 in which both of the reference surfaces 79 and 81 are planar and parallel to the foil 61 so as to provide reference echoes from both the surfaces 79 and 81.

In FIG. 4 there is shown still another embodiment of a front housing 84 which is provided with upstanding posts 86 carrying two reference bars 87 and 88 which are in general alignment with each other but superposed one above the other and spaced apart from each other.

The reference bar 87 is provided with a planar surface 89 which is parallel to the foil 61 and a curved surface 91 which is curved so as not to provide a reflection. Similarly, the reference bar 88 is provided with a planar surface 92 parallel to the foil 61 and also parallel to the surface 89. The surface 93 is rounded so as not to provide an echo.

In FIG. 5 there is provided still another embodiment of a front housing. In that embodiment, the front housing 96 is provided with two pairs of upstanding posts 97 and 98 with post 97 carrying one reference bar 99 and the other post 98 carrying another reference bar 101. The reference bar 99 is provided with a surface 102 which is planar and parallel to the foil 61. It is also provided with a surface 103 which is rounded to inhibit echoes from that surface. The bar 101 is provided with a planar surface 104 parallel to the foil 61. It is also provided with a surface 106 which is rounded to inhibit echoes. With the arrangement shown it can be seen that the reference bar can be disposed at any angle with respect to the foil 61 and still accomplish the desired purpose. It is desirable that the surfaces 102 and 104 be spaced at different distances from the foil. It also should be appreciated that, if desired, the reference bars can be supported in any suitable manner from the front housing. For example, instead of separate posts, a single set of posts can be provided supporting a ring in which the reference bars can be inserted as cross members.

Operation and use of the transducer 11 hereinbefore described may now be briefly described, as follows: Let it be assumed that it is desired to utilize the transducer 11 in a system and apparatus of a suitable type as, for example, of the type disclosed in application, Ser. No. 532,576, filed on Sept. 15, 1983 and entitled "ULTRASONIC APPARATUS, SYSTEM AND METHOD." When the transducer 11 is supplied with electrical energy of a suitable frequency as, for example, from 100 to 500 kilohertz and preferably in a range of 250 kilohertz it will produce ultrasonic energy at that frequency. As is well known to those skilled in the art, the application of such energy to the transducer will cause the foil 61 to move very rapidly to cause it to move air to propagate sound energy.

As the ultrasonic energy passes from the transducer, it impinges upon the surface 73 of the reference bar 72. The surface 73 of the reference bar 72 is a known distance away from the foil 61. Two timers are utilized in this embodiment of the system. One of the timers is utilized for determining the time it takes the sound energy to leave the transducer and to echo from the reference surface 73. The other timer is utilized to calculate the time it takes the sound energy to leave the transducer and to echo from the target. As pointed out previously, the reference bar 72 is of a size so that it will not block most of the sound energy leaving the transducer so that sound energy will reach the target as well as the reference bar. The computer which is provided in the system is then utilized to calculate the exact distance to the target utilizing the two times of the ultrasonic energy to echo from the surface 73 and to echo from the target. By utilizing the reference and such calculations it is possible to eliminate the effects of temperature on the speed travel of sound in the gas in which the target is located as, for example, generally air. Since the reference surface 73 is a known distance away from the foil, the precise distance of the target from the foil can be readily calculated by the computer utilizing the ratios of the two times. In the embodiment of the invention shown in FIG. 2, there is no significant echo produced by the surface 74 because it has been rounded permitting the sound energy to travel around that surface without creating an echo.

However, with respect to the embodiment of the invention shown in FIG. 2, it has been found that has been difficult to ascertain the precise or exact position of the foil 71. It has been found that the foil after it has been excited and since it is so thin and pliable, does not necessary return exactly to the same position as before the transmission commenced. In other words, it has been found that the foil serves as a poor reference point from which to make measurements to the reference bar for calibration purposes. It has been found that this difficulty with the positioning of the foil can be eliminated by the use of two fixed references positioned between the foil and the target. When this is the case, it is necessary to provide three timers for timing the elapsed time for the three possible echoes. Such an arrangement is shown in FIG. 3 in which two reference surfaces are provided, namely, surfaces 79 and 81, both of which are planar and parallel to the foil 71 with the two reference surfaces 79 and 81 being spaced a known distance apart. The three timers utilized in the system are started at the time the sound energy leaves the foil with the first timer measuring the time for the echo to return from the surface 79, the second timer measuring the time it takes for the sound to travel from the foil 61 and the echo to return from the second surface 81 and the third timer measuring the time it takes for sound to travel from the foil 61 to the target and its echo to return from the target. By knowing how far apart the reference surfaces 79 and 81 are from each other, the precise foil position is immaterial. The computer in the system takes the time recorded by the first timer and subtracts it from the time for the second timer. This difference is then utilized for calculating the actual distance to the target as was done with a sample reference, except that a scaler value is used to compensate for the differential measurement made for the time of travel between the foil and the first and second reference surfaces. As can be seen by utilizing two references, it is unnecessary to know exactly how far the references are from the foil and for that reason the measurement can be relatively independent of the position of the foil and still can be made so that it is independent of temperature. A further embodiment is using the inner reference bar's echo to start two timers. One timer for the target, the other for the second reference echo. This way one set of timers is eliminated.

The embodiments shown in FIGS. 4 and 5 can also be utilized in a similar manner to provide two reference surfaces.

It is apparent from the foregoing that there has been provided an ultrasonic transducer and method which makes it possible to propagate ultrasonic energy efficiently and to make accurate distance measurements. It also makes it possible to ascertain the distances of two objects relatively precisely and substantially independently of the temperature of the air. In addition, it is possible to make such measurements accurately without precisely knowing the spacing between a reference and the foil propagating the sound energy.

Figure 6:
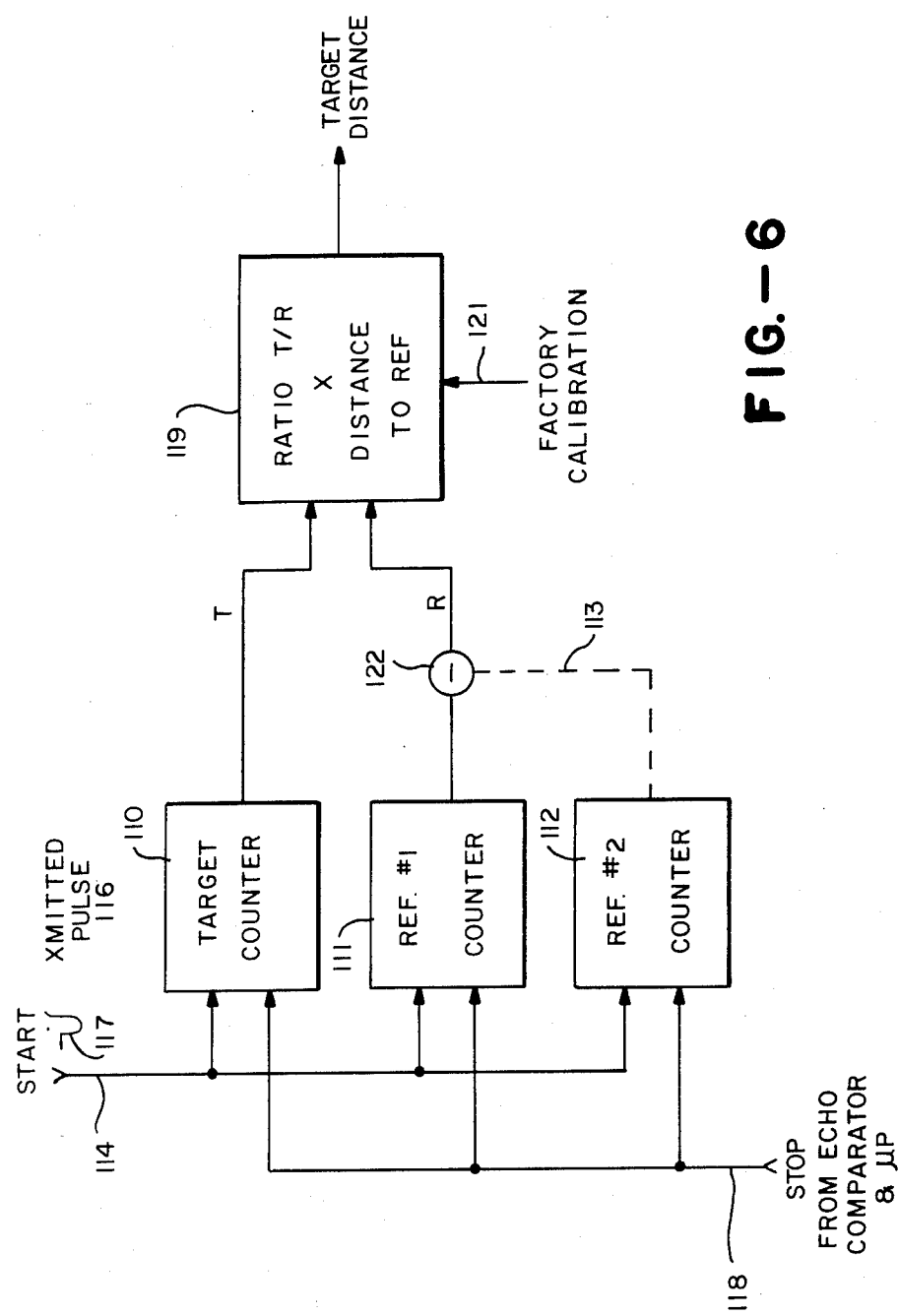
FIG. 6 is a block diagram illustrating the timing technique to estimate target distance.

FIG. 6 illustrates the foregoing technique of computing the distance to target independent of temperature variations and includes a target counter 110, a counter 111 responsive to a first reference surface, and a counter 112 responsive to a second reference surface. As is apparent by the dashed line 113 at the output of counter 112, this counter is optional or may be eliminated if only one reference is desired. Furthermore, as discussed above, the counter start input at 114 is driven by the transmitted transducer pulse 116 and specifically where the pulse has its first negative excursion or dip 117. A stop input at 118 is provided for each of the counters and at an exact phase point of a received echo, as will be discussed in conjunction with FIGS. 7 and 8. Of course, an associated microprocessor (FIG. 10) is utilized to determine which is the transmitted pulse which is followed by a first reference echo, a second reference echo and a target echo. In order to compute the distance to target, at 119 the ratio of the echo and reference echo is taken and multiplied by the known distance to the reference ban, assuming only the reference #1, counter 111 is utilized. Since the reference bar must be a known distance the preferred technique in accordance with the invention is to construct a specific apparatus, measure this distance, and then assign a particular calibration number to that transducer apparatus. This is indicated by the factory transducer calibration input 121. This technique eliminates manufacturing to close tolerances in that the reference bar does not have to be placed at an exact known distance.

Finally, in accordance with the alternative embodiment of the use of the second reference counter 112, when this is used its count is subtracted, as indicated at 122, from the first reference counter, a scalar added, and then the same ratio taken.

FIG. 7 illustrates the waveform of a typical received echo signal from the reference or target. In order to provide repeatable and accurate information it is necessary to provide a stop pulse at exactly the same phase location of the echo pulse or signal. The technique used in the present invention is that the echo signal must pass positively above a threshhold and then the stop signal is provided at the next zero crossing. Such a threshhold is indicated at 123 of approximately 400 millivolts. The stop occurs at the zero crossing at 124, and is so labeled. Note that in accordance with the previous discussion in FIG. 6, the start signal occurs at the first dip and is also labeled. The timing here is very precise, since the time duration from start to stop is four microseconds. Other alternatives are of course available such as utilizing the second zero crossing.

In any case, to implement the stopping scheme of FIG. 7, a comparator with a large hysteresis is utilized as illustrated in FIG. 8. The threshhold of the comparator is indicated as 400 millivolts (which is an arbitrary number). The use of the large hysteresis provides for a stop signal to occur at the first zero crossing after the threshhold is reached. Thus, this provides the stop signal for both the target and reference counters 110, 111, and 112.

In order to provide a predictable received signal in the format as illustrated in FIG. 7, it is necessary that the envelope of the transmitted pulse have a very rapid rise time. This is not the same thing as having a sudden supersonic motion of the transducer surface which would create a short wave. To achieve a rapid rise time, a pulse generating circuit which avoids inductive components (that is, is inductorless) is utilized as indicated in FIG. 9. This is as opposed to pulse transformers which have been utilized. In the present invention, a fixed high voltage supply 126 of for example 300 volts D.C. is connected to the transducers 31 solely by means of a resistor 127. As described above, the transducer is an effective capacitor. Therefore, in operation the capacitor is charged through resistor 127. Then to produce the transmitted pulse to the target and the reference bars a voltage field effect transistor switch 128 is triggered by a control pulse from the transmitter receive switch 33. All of the stored energy contained in the capacitor of transducer 31 is rapidly converted to ultrasonic energy. Thus, the echo signal will be a precise waveform which is suitable for accurate analysis of the type shown in FIG. 7.

However, since the transducer must be charged again in order to receive the echo signal (and such received signal is received by the transmit receive switch 33 on line 129), this charging must occur very rapidly (preferably less than 100 microseconds) so that a received echo pulse from a reference bar is not masked. The inductorless circuit and the use of resistor 127 which serves as a damping resistor accomplishes the foregoing. In effect, ringdown time is minimized.

A specific receive circuit on line 129 includes a D.C. blocking capacitor 131, a current limiting resistor 132 and a pair of blocking diodes 133. Thus, in summary, the resistor 127 acts as both a charging resistor and after the sudden discharge as a damper to quiet the ringdown oscillations.

Figure 10:
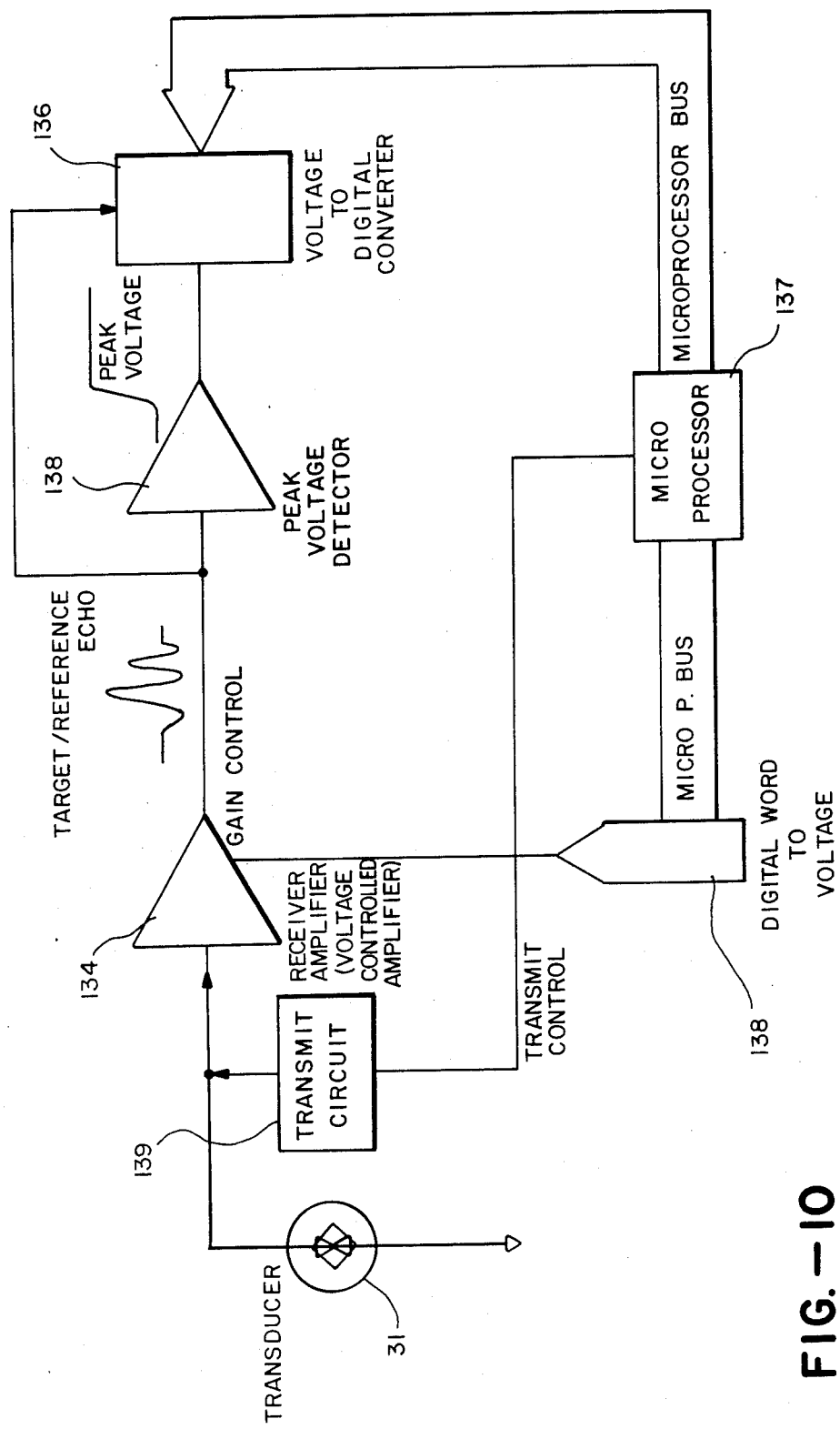
FIG. 10 is a block diagram of the overall pulse production and echo receive system including a gain compensation circuit.

Since over time the sensitivity of transducer 31 may vary because of for example aging, it is necessary to provide a gain compensation circuit of FIG. 10. In general this illustrates the overall circuit diagram of the electrical components necessary for processing and generating a pulse and processing echo signals. Transducer 31 is connected to a receive circuit including a voltage controlled receiver/amplifier 134 whose output is either routed directly to a voltage to digital converter 136 whose information is then processed by a microprocessor in addition to controlling other facets of the process (such as selecting reference echoes) drives a digital word to voltage converter 138 which is connected to amplifier 134 to change its gain. Finally, microprocessor 137 of course controls the transmit circuit 139 as for example illustrated in FIG. 9. This would be part of the transmit receive switch 33.

In operation the transducer 31 is first fired by the transmit circuit 139 to produce an ultrasonic pulse. Microprocessor 137 then engages the receiver to listen for echo signals from either one or both references and the target. Initially, the peak voltage detector 138 is inserted in the circuit by the microprocessor 137 and the peak voltage of a reference echo is converted to a digital number by converter 136. If this is less than a preset value, it indicates the transducer is too weak, and thus the gain of the receiver/amplifier 134 is increased by the microprocessor 137. Thus, in effect, a feedback process is implemented. Thereafter, normal processing of the echoes takes place as indicated schematically in FIG. 6 where ratios are taken and multiplication of the distance to the reference is accomplished by microprocessor 137., Thus, an improved apparatus for detecting the distance to an object has been provided. It should be emphasized that although a single transducer has been shown which functions as a transceiver, (that is, it both transmits and receives the ultrasonic information) the invention also contemplates the use of separate units.

The embodiment of FIG. 11 is similar to that of FIGS. 1 and 2, in that the ultrasonic transducer includes a cylindrical mounting stud 12' with a co-axial cable 31' and a front cylindrical housing 13' with legs 71' carrying an appropriate reference bar.

Housing 13' which is composed of, for example, aluminum which has been anodized is fastened to mounting stud 12' and encloses the transducer assembly which includes a piston 140 and an associated foil 141. piston 140 which is composed of aluminum includes a stud portion 142 and is generally retained by a plastic disc 143 having a recess 144 in its top surface. This is shown in FIG. 12.

Referring briefly to FIGS. 14A and 14B, the surface of the mounting disc 143a is made flush with the surface of 140a of the piston 140 by the process as illustrated in FIG. 14A of first gluing the piston 140 in the recess 144. Thereafter as shown by the dashed line 146 planing of this combination provides the resultant flush surface 140a, 143a in FIG. 14B. This provides a good surface for the foil 141 which is later fixed to surface 143a and freely vibrates with respect to surface 140a.

Specifically referring to FIG. 12, the foil is composed of a MYLAR or KAPTON insulating layer 147 which has evaporated on it a very thin layer of gold 148. On the central portion of the gold foil 148 there is a nonconductive protective layer such as silicone based plastic 149 which typically is vapor depositied. A suitable material is PARYLENE. When the ultrasonic transducer is used in severe ambient condition, it protects the very thin gold layer from chemicals and abrasions. This is necessary, for example since the gold may be only 300 angstroms thick. The PARYLENE layer may be approximately 2 micrometers. Because of the thinness of the PARYLENE, it does not affect the production of the beam of ultrasonic energy which is transmitted from the surface of the foil.

Lastly, an annular ring 151 of, for example, silver paint is coated on the gold surface 148 to provide for more effective conductive contact with the housing 13' as illustrated in FIG. 11. More specifically this contact is the effective ground for the foil and is implemented by the fact of the retaining screws 152 holding the housing 13' to the mounting stud 12', Also contact occurs between the housing and mounting stud at the interface 153. Thus, the mounting stud is, in essence, the ground connection and as indicated at the terminal 154 is connected to the ground of the co-axial cable 31'.

Referring briefly to FIG. 13, the co-axial cable 31' with its outer cable as ground as shown in 154, provides on its inner cable 156 an appropriate alternating voltage for producing the ultrasonic beam. In other words, this is an appropriate electrical voltage in which line 156 is connected to the aluminum piston 140 with the foil 141 being grounded thereto by forming an effective capacitor. To ensure there is no build-up of static voltage on the piston 149, there is a bypass leakage resistor 157 with a relatively high resistance, for example 10 megohms, provided between line 156 and ground. This resistance is contained in the shroud 157, as illustrated in FIG. 11. The center cable 156 is connected to the stud 142 of piston 140.

In operation, of course, the foil 141 is fixed only to the plastic mounting disc 143 so that it can freely vibrate or freely move with respect to piston 140. In accordance with patent application, Ser. No. 532,576 filed Sept. 15, 1983 entitled "ULTRASONIC APPARATUS SYSTEM AND METHOD" and assigned to the present assignee, the surface 140a of the piston 140 which interfaces with the foil is treated to enhance the production of ultrasonic energy. And, of course, a substantial portion of the foil 141 is exposed because of the cylindrical nature of housing 13' to allow the production of an ultrasonic beam approximately along the nominal axis 161.

Since the inside of the transducer, that is, the interface between foil 141 and piston 140, must be sealed to avoid environmental contamination, this can lead to static pressure build-up for relatively hot ambient temperatures or when barometric pressure is lowered. For venting an air passage way 162 is provided in the stud 142 of the piston 140 by means of a hole 163 drilled through the centerline of the piston. Then screw 164 is placed in hole 163 which again is drilled in the center to provide the passage 162.

As illustrated in FIG. 11, in one embodiment attached to this air passage is a resilient bag or balloon 166. Toy balloon is contained in a plastic tube 167 which holds it on the coupling 168 which in turn is attached to the smaller diameter rubber tube 169 which is affixed to the end of screw 164. Thus, this provides for full containment of the atmosphere.

Alternatively, as illustrated in FIG. 14B, the coaxial signal cable 171 itself can be used which has an air passage 172 in it. Thus, this allows the air to pass freely between the transducer and the electronic processing unit 173 which is remote from the ambient conditions of the transducer. Within the processing unit, the air can be expelled to the ambient air or alternatively a resilient bag 166 can still be employed within. The special coaxial cable 171 which, of course, also includes the appropriate electrical connections to drive the transducer may be of a type sold under the trademark "HELIAX." This is a spirally wrapped coaxial cable.

As illustrated in FIG. 15A, in order to protect the transducer from industrial contaminants, such as oil, water and sawdust, etc., a covering material in the form of a cone 173 is placed over the housing 13' and the reference bar legs 71'. This material is made typically of a polyester cloth which has a weave which is tight enough to eliminate dust but yet allow effective transmission without undue attenuation of ultrasonic energy.

FIG. 15C illustrates the cloth as it is cut initially and then when it is folded at the line 174 and placed over housing 13', the edges of the cloth are seared or fused together at 176 and 177, as illustrated in FIG. 15B to provide a tight fit.

As illustrated in FIG. 16, when an object to be examined as illustrated at 178 is a diameter of the order of magnitude of ¼" inch or is in close proximity to other uninteresting structures, it is useful to have an effectively smaller beam. Thus, a plate 179 is provided which is at a predetermined distance of the foil of the transducer and which includes an aperture 181 with the center of the aperture on the nominal beam axis 161. This provides a smaller sensing beam 182 and allows the beam to be reflected back to the transducer. At the same time angling the plate 179 at an acute angle to axis 161, the the beam is deflected at 183 to prevent unwanted reflections.

Alternatively assuming that the plate 179 was perpendicular to axis 161), by the use of distance ranging techniques, this unwanted deflected beam could be reflected back to the transducer and eliminated; in other words, the plate 179 is closer than the object 178.

Finally, where an extremely small object, 184 as illustrated in FIG. 17, is required to be examined with reatively high sensitivity, this can be achieved by using a parabolic reflector 186 which again is mounted at predetermined distance from the housing 13' and on the nominal axis 161 of the beam to provide a focal point 187. This is a very small area relative to the beam which is generally indicated as 188. Reflector 186 may be either a linear paraboidal or a circular paraboloid. Thus, an improved ultrasonic transistor is provided.

What is claimed is:

1. In an apparatus for detecting the distance to an object using ultrasonic energy, transducer means including a foil for creating ultrasonic energy, a first reference having a surface for reflecting ultrasonic energy to create an echo, the reference positioned between the transducer and the object with the first reference being at a known distance from the transducer, means forming a second reference having a surface spaced a predetermined distance away from the first reference surface and being disposed between the transducer and the object, means for ascertaining the elapsed times between the echoes received from the first and second reference surfaces and from the object for ascertaining the distance to the object independent of the exact position of the foil in the transducer and of temperature.

2. Apparatus as in claim 1 wherein said first and second reference surfaces are carried by a single reference bar.

3. Apparatus as in claim 1 wherein said first and second references are carried by separate reference bars.

4. Apparatus as in claim 1 wherein said reference surfaces are disposed at an angle with respect to each other.

5. Apparatus as in claim 1 wherein said first and second reference surfaces are disposed in planes generally parallel to the plane of the foil.

6. Apparatus as in claim 1 where said known distance is measured after construction of said apparatus whereby each apparatus may have a unique calibration.

7. Apparatus as in claim 1 including an inductorless pulse-generating means for activating said transducer means.

8. Apparatus as in claim 7 where said transducer means is an effective capacitor and including means for charging said capacitor and suddenly shorting said capacitor to ground to produce a pulse of ultrasonic energy.

9. Apparatus as in claim 8 where said means for charging said capacitor includes resistive damping means whereby ringdown time is minimized.

10. Apparatus as in claim 9 where said resistive damping means is included in a charging circuit.

11. Apparatus as in claim 1 including counting means for computing said times, said counting means being responsive to the receipt of object and reference echo pulses to always stop counting at the same time relative phase location of said pulses.

12. Apparatus as in claim 11 where said counting means includes comparator means having a large hysteresis driven by said echo pulses.

13. Apparatus as in claim 1 including means responsive to peaks of said echoes for adjusting the gain of amplifier means associated with said transducer whereby aging of the transducer is compensated.

14. In a method for detecting the distance to an object using ultrasonic energy which is independent of temperature, positioning a first echo producing reference surface between the transducer providing the ultrasonic energy and the target with the first reference surface being positioned a known distance from the transducer, positioning a second reference surface spaced a known distance from the first reference surface; and ascertaining the elapsed times for ultrasonic energy to travel to and from the first reference surface and to and from the second reference surface and to and from the object to provide a measurement of the distance to the object which is independent of temperature and which is also independent of the spacing of the first and second reference surfaces from the transducer.

* * * * *